No. 883,174. PATENTED MAR. 31, 1908.
F. S. DAVIDSON & W. P. BURRA.
PROCESS OF FORMING EXTRACTS FROM HOPS AND YEAST.
APPLICATION FILED APR. 10, 1907.
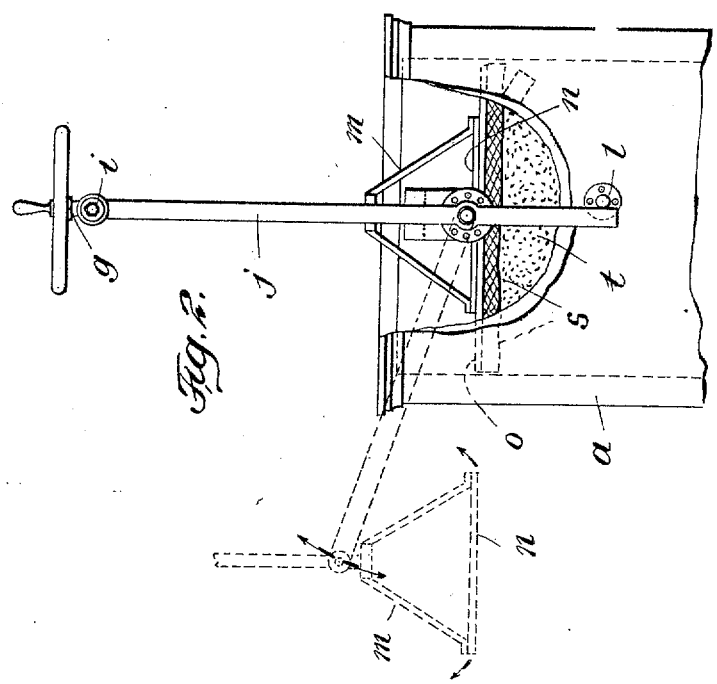
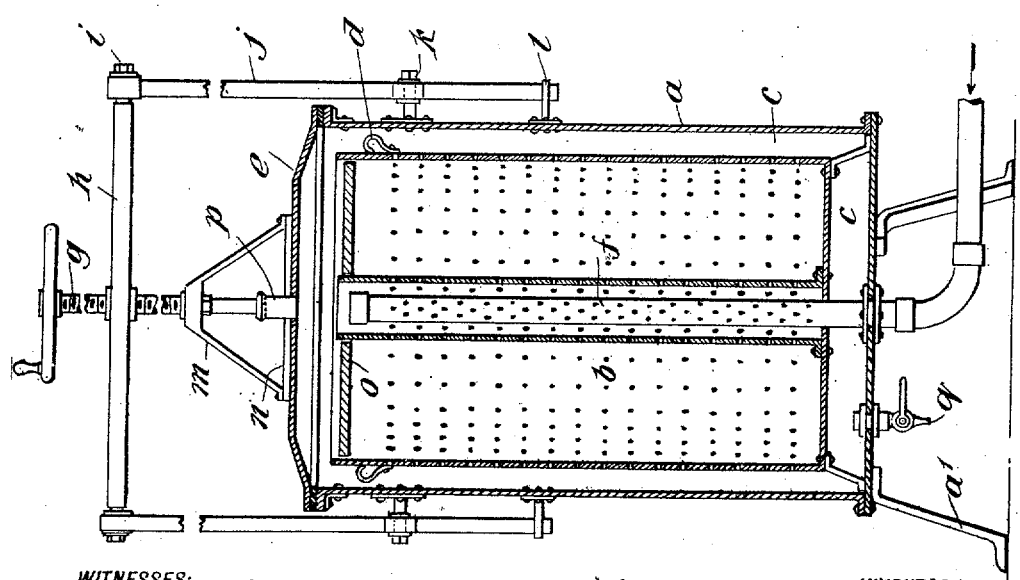

UNITED STATES PATENT OFFICE.

FRANCIS SYDNEY DAVIDSON AND WILLIAM POMFRET BURRA, OF ASHFORD, ENGLAND.

PROCESS OF FORMING EXTRACTS FROM HOPS AND YEAST.

No. 883,174.  Specification of Letters Patent.  Patented March 31, 1908.

Application filed April 10, 1907. Serial No. 367,426.

*To all whom it may concern:*

Be it known that we, FRANCIS SYDNEY DAVIDSON and WILLIAM POMFRET BURRA, both subjects of the King of Great Britain and Ireland, and residents of Ashford, Kent, England, have discovered certain new and useful Improvements in a Process of Forming Extracts from Hops and Yeast, of which the following is a specification, such as will enable others skilled in the art to which it appertains to make and use the same.

An object of this invention is to obtain an extract from hops and yeast containing the full essence and more volatile and aromatic principles of hops, which are usually lost in the boiling of hops alone in the ordinary manner so that such principles may be fixed in liquid form.

To such ends our invention consists in substance in placing a mixture of the hops and yeast in a suitable form of closed apparatus or digester, submitting the mixture to the action of a solvent vapor, for example, live steam, and cooling and collecting the resultant liquid extract.

To carry out this process we place in an apparatus of any suitable form, for example, a digester, say 301 pounds of hops and 41 pounds of yeast, first placing half of the hops in the digester, then adding the yeast and putting in the remainder of the hops on top of the yeast. Of course this method of mixing the hops and yeast may be varied. The digester is then closed and steam under a pressure of 25 pounds admitted for say about 90 minutes, at the end of which time the steam is turned off, and that remaining in the digester allowed to condense for about 30 minutes more, whereupon the condensed extract is drawn off. The apparatus may then be opened and the mass of hop leaves removed and subjected to pressure. It is preferable that the mixture of hops and yeast be subjected to pressure before removal from the apparatus so as to press out the remainder of the fluid extract caught in the mass of the hops. The kind of yeast used is ordinary brewer's yeast (*Sacch. cerevisiæ*).

The liquid extract so obtained may be used in many ways and for many purposes, and when used in the manufacture of beer, for which it is primarily intended, it is run into the fermenting vats or vessels at the same time as the wort, so as to mingle thoroughly therewith, and thereby a much more highly flavored and aromatic beer will be obtained with a saving of practically 25 per cent. in the amount of hops as used in the present process of making beer.

Heretofore in the manufacture of beer the hops were simply boiled in an open or closed vessel. During this process of boiling the volatile oils and essences were mostly evaporated and lost in the atmosphere. We found that without the use of yeast these volatile essences were largely lost in our process, but by adding yeast the extract obtained was of a totally different quality and the volatile oils and essences were largely fixed by the chemical reaction that took place as the yeast decomposed. What this actual re-action is no one has yet found out, and it is extremely difficult to say whether it could be found out in the present state of chemical knowledge. From our experiments and practical experience, however, extending from July 1906, up to date, November, 1907, during which period we have used this process in brewing in nearly every brew, we have found that the use of yeast was essential for this manufacture.

One object, aside from improving the flavor of the beer, is to economize as to the amount of hops used in each brewing.

Any suitable form of digester or press may be used, and this process is not limited to any particular form of apparatus nor to the exact form in all particulars of the steps described. In the accompanying drawing we have illustrated a form of apparatus by which our process may be carried out. We do not make any claim herein for this form of apparatus as the same forms the subject matter of our co-pending application, Serial No. 369,176, filed April 19, 1907.

In the accompanying drawing; Figure 1 is a sectional elevation of an extracting apparatus, constructed according to our invention in which the cover is in position, and is shown held down by the hand screw. Fig. 2 is a view partly in section of the top of a similar apparatus and shows the cover removed and the inner plate being pressed down by the hand screw. The dotted lines indicate the position taken by the hand screw and its supports when swung to one side.

In these drawings $a$ is the outer case mounted on legs $a'$ $b$ is the perforated holder, and $c$ the space between $a$ and $b$. The holder $b$ is provided with lifting rings $d$, $e$ is the cover of the case. A perforated steam pipe $f$ is centrally arranged in a tubular perforated passage in the holder $b$. The steam for pipe $f$ can be supplied from any convenient source. A hand wheel $g$ is mounted on bar $h$ which is pivotally attached at $i$ to the side arms $j$, which are mounted on joints or trunnions $k$ on the case. Stops $l$ serve to limit the movement in one direction of the bars $j$. Attached to the hand wheel $g$ is a frame $m$, which carries a ring $n$ and serves to press down the cover $e$, or when the latter is removed the plate $o$. The letters $p$ and $q$ designate respectively the safety valve and the draw-off cock.

In Fig. 2, the hops $t$ are shown being pressed down by the plate $o$.

What we claim is:

1. The process of forming extracts from hops and yeast, which consists in mixing the hops and yeast, subjecting the mixture to the action of a solvent vapor, and condensing the resultant product.

2. The process of forming extracts from hops and yeast, which consists in mixing the hops and yeast and then subjecting the mixture to the action of steam under a pressure of approximately 25 pounds per square inch and drawing off the resultant product.

3. The process of forming extracts from hops and yeast, which consists in making a mixture of the hops and yeast, subjecting the mixture to the action of steam, and drawing off the resultant liquid from the residue mixture of hops and yeast.

4. The process of forming extracts from hops and yeast, which consists in making a mixture of the hops and yeast, subjecting the mixture to the action of live steam under a pressure greater than atmospheric pressure, shutting off the steam supply and allowing the mixture to cool, pressing the mixture, and finally drawing off the resultant condensed liquid extract.

5. The process of forming extract from hops and yeast, which consists in making a mixture of the hops and yeast in substantially the proportion of 41 lbs. of yeast to 301 lbs. of hops, steaming the mixture out of contact with the atmosphere, cooling the steamed mixture, and drawing off the resultant condensed liquid extract.

In witness whereof we have hereunto set our hands in presence of two witnesses.

FRANCIS SYDNEY DAVIDSON.
WILLIAM POMFRET BURRA.

Witnesses:
W. J. SKERTEN,
J. P. CRAWLEY.